(12) United States Patent
Swope et al.

(10) Patent No.: US 10,145,955 B2
(45) Date of Patent: Dec. 4, 2018

(54) METHODS AND SYSTEMS FOR PROCESSING POINT-CLOUD DATA WITH A LINE SCANNER

(71) Applicant: SYMBOL TECHNOLOGIES, LLC, Lincolnshire, IL (US)

(72) Inventors: Charles B. Swope, Coral Gables, FL (US); Richard Mark Clayton, Manorville, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 311 days.

(21) Appl. No.: 15/015,228

(22) Filed: Feb. 4, 2016

(65) Prior Publication Data
US 2017/0227645 A1    Aug. 10, 2017

(51) Int. Cl.
*G01C 3/08*    (2006.01)
*G01S 17/89*    (2006.01)
*G01S 7/481*    (2006.01)

(52) U.S. Cl.
CPC ............ *G01S 17/89* (2013.01); *G01S 7/4817* (2013.01)

(58) Field of Classification Search
CPC ............................... G01S 17/89; G01S 7/4817
USPC ........................................................ 356/5.01
See application file for complete search history.

(56) References Cited

U.S. PATENT DOCUMENTS

| | | | |
|---|---|---|---|
| 5,408,322 A | 4/1995 | Hsu et al. | |
| 5,988,862 A | 11/1999 | Kacyra et al. | |
| 6,115,114 A * | 9/2000 | Berg | G01B 11/00 177/25.15 |
| 6,995,762 B1 | 2/2006 | Pavlidis et al. | |
| 7,137,207 B2 | 11/2006 | Armstrong et al. | |
| 7,248,754 B2 | 7/2007 | Cato | |
| 7,277,187 B2 | 10/2007 | Smith et al. | |
| 7,373,722 B2 | 5/2008 | Cooper et al. | |
| 7,474,389 B2 | 1/2009 | Greenberg et al. | |
| 7,487,595 B2 | 2/2009 | Armstrong et al. | |
| 7,527,205 B2 | 5/2009 | Zhu et al. | |
| 7,605,817 B2 | 10/2009 | Zhang et al. | |
| 7,647,752 B2 | 1/2010 | Magnell | |
| 7,726,575 B2 | 6/2010 | Wang et al. | |
| 8,094,937 B2 | 1/2012 | Teoh et al. | |

(Continued)

FOREIGN PATENT DOCUMENTS

| | | |
|---|---|---|
| CA | 2835830 A1 | 11/2012 |
| CN | 104200086 A | 12/2014 |

(Continued)

OTHER PUBLICATIONS

"Fair Billing with Automatic Dimensioning" pp. 1-4, undated, Copyright Mettler-Toledo International Inc.

(Continued)

*Primary Examiner* — Mark Hellner (57) ABSTRACT

Described herein are methods and systems for processing point-cloud data with a line scanner. One embodiment takes the form of a method that includes: receiving a 3D point cloud that is representative of an object; using one or more line scanners to identify one or more respective outer bounds of the object; and dimensioning the object based on points in the point cloud, wherein each of the points in the point cloud that are used for dimensioning the object is at or inside every identified outer bound.

20 Claims, 9 Drawing Sheets

(56) References Cited

U.S. PATENT DOCUMENTS

| | | |
|---|---|---|
| 8,132,728 B2 | 3/2012 | Dwinell et al. |
| 8,134,717 B2 | 3/2012 | Pangrazio et al. |
| 8,199,977 B2 | 6/2012 | Krishnaswamy et al. |
| 8,265,895 B2 | 9/2012 | Willins et al. |
| 8,284,988 B2 | 10/2012 | Sones et al. |
| 8,463,079 B2 | 6/2013 | Ackley et al. |
| 8,479,996 B2 | 7/2013 | Barkan et al. |
| 8,542,252 B2 | 9/2013 | Perez et al. |
| 8,599,303 B2 | 12/2013 | Stettner |
| 8,660,338 B2 | 2/2014 | Ma et al. |
| 8,743,176 B2 | 6/2014 | Stettner et al. |
| 8,757,479 B2 | 6/2014 | Clark et al. |
| 8,812,226 B2 | 8/2014 | Zeng |
| 8,989,342 B2 | 3/2015 | Liesenfelt et al. |
| 9,007,601 B2 | 4/2015 | Steffey et al. |
| 9,070,285 B1 | 6/2015 | Ramu |
| 9,129,277 B2 | 9/2015 | MacIntosh |
| 9,329,269 B2 | 5/2016 | Zeng |
| 9,396,554 B2 | 7/2016 | Williams et al. |
| 9,400,170 B2 | 7/2016 | Steffey |
| 9,549,125 B1 | 1/2017 | Goyal et al. |
| 9,562,971 B2 | 2/2017 | Shenkar et al. |
| 9,600,892 B2 | 3/2017 | Patel et al. |
| 9,778,388 B1 | 10/2017 | Connor |
| 9,791,862 B1 | 10/2017 | Connor |
| 2001/0041948 A1 | 11/2001 | Ross et al. |
| 2002/0164236 A1 | 7/2002 | Fukuhara et al. |
| 2002/0158453 A1 | 10/2002 | Levine |
| 2004/0240754 A1 | 2/2004 | Smith et al. |
| 2005/0016004 A1 | 1/2005 | Armstrong et al. |
| 2005/0114059 A1 | 5/2005 | Chang et al. |
| 2006/0106742 A1 | 5/2006 | Bocchicchio et al. |
| 2007/0074410 A1 | 4/2007 | Armstrong et al. |
| 2007/0272732 A1 | 11/2007 | Hindmon |
| 2008/0238919 A1 | 10/2008 | Pack |
| 2009/0088975 A1 | 4/2009 | Sato et al. |
| 2009/0103773 A1 | 4/2009 | Wheeler et al. |
| 2009/0152391 A1 | 6/2009 | McWhirk |
| 2009/0323121 A1 | 12/2009 | Valkenburg et al. |
| 2010/0026804 A1 | 2/2010 | Tanizaki et al. |
| 2010/0091094 A1 | 4/2010 | Sekowski |
| 2010/0118116 A1 | 5/2010 | Tomasz |
| 2010/0131234 A1 | 5/2010 | Stewart et al. |
| 2010/0208039 A1 | 8/2010 | Stettner |
| 2010/0295850 A1 | 11/2010 | Katz |
| 2010/0315412 A1 | 12/2010 | Sinha et al. |
| 2011/0047636 A1 | 2/2011 | Stachon et al. |
| 2011/0052043 A1 | 3/2011 | Hung |
| 2011/0137527 A1 | 6/2011 | Simon et al. |
| 2011/0168774 A1 | 7/2011 | Magal |
| 2011/0172875 A1 | 7/2011 | Gibbs |
| 2011/0216063 A1 | 9/2011 | Hayes |
| 2011/0286007 A1* | 11/2011 | Pangrazio ............... G01B 11/00 356/614 |
| 2011/0310088 A1 | 12/2011 | Adabala et al. |
| 2012/0075342 A1 | 3/2012 | Choubassi et al. |
| 2012/0179621 A1 | 7/2012 | Moir et al. |
| 2012/0185112 A1 | 7/2012 | Sung et al. |
| 2012/0209553 A1 | 8/2012 | Doytchinov et al. |
| 2012/0236119 A1 | 9/2012 | Rhee |
| 2012/0249802 A1 | 10/2012 | Taylor |
| 2012/0250978 A1 | 10/2012 | Taylor |
| 2012/0287249 A1 | 11/2012 | Choo et al. |
| 2013/0144565 A1 | 6/2013 | Miller |
| 2013/0156292 A1 | 6/2013 | Chang et al. |
| 2013/0162806 A1 | 6/2013 | Ding et al. |
| 2013/0228620 A1 | 9/2013 | Ahern et al. |
| 2013/0236089 A1 | 9/2013 | Litvak et al. |
| 2013/0299306 A1 | 11/2013 | Jiang et al. |
| 2013/0299313 A1 | 11/2013 | Baek, IV et al. |
| 2013/0321418 A1 | 12/2013 | Kirk |
| 2013/0329013 A1 | 12/2013 | Metois et al. |
| 2013/0341400 A1 | 12/2013 | Lancaster-Larocque |
| 2014/0002597 A1 | 1/2014 | Taguchi |
| 2014/0028837 A1 | 1/2014 | Gao et al. |
| 2014/0049616 A1 | 2/2014 | Stettner |
| 2014/0098094 A1 | 4/2014 | Neumann |
| 2014/0100813 A1 | 4/2014 | Showering |
| 2014/0104413 A1 | 4/2014 | McCloskey et al. |
| 2014/0192050 A1 | 7/2014 | Qiu |
| 2014/0267614 A1 | 9/2014 | Ding et al. |
| 2014/0267688 A1 | 9/2014 | Aich et al. |
| 2014/0300637 A1 | 10/2014 | Fan et al. |
| 2014/0351073 A1 | 11/2014 | Murphy et al. |
| 2015/0015602 A1 | 1/2015 | Beaudoin |
| 2015/0088618 A1 | 3/2015 | Basir et al. |
| 2015/0092066 A1 | 4/2015 | Geiss et al. |
| 2015/0106403 A1 | 4/2015 | Haverinen et al. |
| 2015/0154467 A1 | 6/2015 | Feng |
| 2015/0161793 A1 | 6/2015 | Takahashi |
| 2015/0181198 A1 | 6/2015 | Baele et al. |
| 2015/0379704 A1 | 12/2015 | Chandrasekar et al. |
| 2016/0044862 A1 | 2/2016 | Kocer |
| 2016/0061591 A1* | 3/2016 | Pangrazio ............... G01B 11/04 382/154 |
| 2016/0070981 A1 | 3/2016 | Sasaki et al. |
| 2016/0012588 A1 | 4/2016 | Taguchi |
| 2016/0107690 A1 | 4/2016 | Oyama et al. |
| 2016/0150217 A1 | 5/2016 | Popov |
| 2016/0156898 A1 | 6/2016 | Ren et al. |
| 2016/0163067 A1 | 7/2016 | Williams |
| 2017/0004649 A1 | 1/2017 | Collet Romea et al. |
| 2017/0041553 A1 | 2/2017 | Cao et al. |
| 2017/0150129 A1 | 5/2017 | Pangrazio |
| 2017/0227647 A1 | 8/2017 | Balk |
| 2017/0228885 A1 | 8/2017 | Baumgartner |

FOREIGN PATENT DOCUMENTS

| | | |
|---|---|---|
| EP | 2439487 A1 | 4/2012 |
| EP | 2562688 A2 | 2/2013 |
| EP | 2693362 A1 | 2/2014 |
| WO | 2003/002935 A1 | 1/2003 |
| WO | 2008/057504 A2 | 5/2008 |
| WO | 2008/154611 A2 | 12/2008 |
| WO | 2013/165674 | 11/2013 |
| WO | 2014/092552 A2 | 6/2014 |
| WO | 2015/127503 A1 | 9/2015 |
| WO | 2016/020038 A1 | 2/2016 |

OTHER PUBLICATIONS

"Swift Dimension" Trademark Omniplanar, Copyright 2014.

"Plane Detection in Point Cloud Data" dated Jan. 25, 2010 by Michael Ying Yang and Wolfgang Forstner, Technical Report 1, 2010, University of Bonn.

Brown et al., U.S. Appl. No. 15/078,074, filed Mar. 23, 2016.

Brown et al., U.S. Appl. No. 15/008,710, filed Jan. 28, 2016.

Lecking et al., "Localization in a wide range of industrial environments using relative 3D ceiling features," IEEE, pp. 333-337, Sep. 15, 2008.

Carreira et al., "Enhanced PCA-based localization using depth maps with missing data," IEEE, pp. 1-8 Apr. 24, 2013.

Clayton et al., U.S. Appl. No. 15/358,810, filed Nov. 22, 2016.

Fu et al., U.S. Appl. No. 15/385,113, filed Dec. 20, 2016.

Ziang Xie et al., "Multimodal Blending for High-Accuracy Instance Recognition", 2013 IEEE/RSJ International—Conference on Intelligent Robots and Systems, pp. 2214-2221.

N.D.F. Campbell et al. "Automatic 3D Object Segmentation in Multiple Views using Volumetric Graph-Cuts", Journal of Image and Vision Computing, vol. 28, Issue 1, Jan. 2010, pp. 14-25.

Federico Tombari et al. "Multimodal cue integration through Hypotheses Verification for RGB-D object recognition and 6DOF pose estimation", IEEE International Conference on Robotics and Automation, Jan. 2013.

Ajmal S. Mian et al., "Three-Dimensional Model Based Object Recognition and Segmentation in Cluttered Scenes", IEEE Transactions on Pattern Analysis and Machine Intelligence, vol. 28, No. 10, Oct. 2006.

Gu et al., U.S. Appl. No. 15/242,126, filed Aug. 19, 2016.

(56) References Cited

OTHER PUBLICATIONS

Dubois, M., et al., "A comparison of geometric and energy-based point cloud semantic segmentation methods," European Conference on Mobile Robots (ECMR), vol., no., pp. 88-93, Sep. 25-27, 2013.
Lari, Z., et al., "An adaptive approach for segmentation of 3D laser point cloud." International Archives of the Photogrammetry, Remote Sensing and Spatial Information Sciences, vol. XXXVIII-5/W12, 2011, ISPRS Calgary 2011 Workshop, Aug. 29-31, 2011, Calgary, Canada.
Rusu, et al. "Spatial change detection on unorganized point cloud data," PCL Library, retrieved from Internet on Aug. 19, 2016 [http://pointclouds.org/documentation/tutorials/octree_change.php].
Tahir, Rabbani, et al., "Segmentation of point clouds using smoothness constraint," International Archives of Photogrammetry, Remote Sensing and Spatial Information Sciences 36.5 (Sep. 2006): 248-253.
Golovinskiy, Aleksey, et al. "Min-cut based segmentation of point clouds." Computer Vision Workshops (ICCV Workshops), 2009 IEEE 12th International Conference on. IEEE, 2009.
Douillard, Bertrand, et al. "On the segmentation of 3D LIDAR point clouds." Robotics and Automation (ICRA), 2011 IEEE International Conference on. IEEE, 2011.
Puwein, J., et al., "Robust multi-view camera calibration for wide-baseline camera networks," in IEEE Workshop on Applications of Computer Vision (WACV), Jan. 2011.
Datta, A., et al., "Accurate camera calibration using iterative refinement of control points," in Computer Vision Workshops (ICCV Workshops), 2009.
Olson, Clark F., et al. "Wide-Baseline Stereo Vision for Terrain Mapping" in Machine Vision and Applications, Aug. 2010.
Rusu, et al., "How to incrementally register pairs of clouds," PCL Library, retrieved from the Internet on Aug. 22, 2016 from <http://pointclouds.org/documentation/tutorials/pairwise_incremental_registration.php>.
Meng et al., U.S. Appl. No. 15/131,856, filed Apr. 18, 2016.
F.C.A. Groen et al., "The smallest box around a package," Pattern Recognition, vol. 14, No. 1-6, Jan. 1, 1981, pp. 173-176, XP055237156, GB, ISSN: 0031-3203, DOI: 10.1016/0031-3203(81(90059-5 p. 176-p. 178.
Schnabel et al. "Efficient RANSAC for Point-Cloud Shape Detection", vol. 0, No. 0, pp. 1-12.
Buenaposada et al. "Real-time tracking and estimation of plane pose" Proceedings of the ICPR (Aug. 2002) vol. II, IEEE pp. 697-700.
International Search Report and Written Opinion for International Patent Application No. PCT/US2017/024847 dated Jul. 7, 2017.
International Search Report and Written Opinion for corresponding International Patent Application No. PCT/US2016/065519 dated Apr. 10, 2017.

* cited by examiner

METHODS AND SYSTEMS FOR PROCESSING POINT-CLOUD DATA WITH A LINE SCANNER

BACKGROUND OF THE INVENTION

Three-dimensional (3D) point clouds can be used to determine dimensions of various objects. In the context of moving freight, point clouds can capture freight and a freight-moving vehicle in motion. Dimensions of the freight can be improved by stopping the freight-moving vehicle and setting down the freight; this, however, leads to delays in moving the freight.

Accordingly, there is a need for methods and systems for processing point-cloud data with a line scanner.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

One embodiment takes the form of a method that includes receiving a 3D (three-dimensional) point cloud that is representative of a freight-moving vehicle having loaded freight; using at least one line scanner that is oriented to scan in a vertical plane and positioned to identify a lower bound of the loaded freight; and dimensioning the loaded freight based on points in the point cloud, wherein each of the points in the point cloud that are used for dimensioning the loaded freight is at or above the identified lower bound.

Another embodiment takes the form of a system that includes a communication interface, a processor, and data storage containing instructions executable by the processor for carrying out at least the functions described in the preceding paragraph.

In at least one embodiment the at least one line scanner comprises at least one LIDAR (Light Detection and Ranging) line scanner.

In at least one embodiment the line scanner is affixed to a fixed structure such that the line scanner can capture the bottom most portion of a loaded freight.

In at least one embodiment, the at least one line scanner is oriented to scan in the vertical plane between a first angle below horizontal and a second angle above horizontal positioned such that the line scanner can capture the bottom most portion of a loaded freight.

In at least one embodiment, the at least one line scanner is one line scanner.

In at least one embodiment, the at least one line scanner includes two line scanners that are positioned on substantially opposite sides of the loaded freight positioned such that the line scanner can capture the bottom most portion of a loaded freight.

In at least one embodiment, the lower bound is a lower point.

In at least one embodiment, the lower bound is a lower contour, wherein identifying the lower bound of the loaded freight is further based on positioning information regarding one or both of the freight-moving vehicle and the loaded freight.

In at least one embodiment, using the at least one line scanner to identify the lower bound of the loaded freight is carried out responsive to detecting a triggering event. In one such embodiment, the triggering event comprises receiving an indication from a motion sensor.

In at least one embodiment, dimensioning the loaded freight based on points in the point cloud comprises: generating a reduced point cloud at least in part by removing from the received point cloud all points lower than the identified lower bound; and dimensioning the loaded freight using the reduced point cloud.

In at least one embodiment, the method further comprises using at least one upper-bound line scanner that is oriented to scan in a vertical plane to identify an upper bound of the loaded freight, and dimensioning the loaded freight based on points in the point cloud comprises dimensioning the loaded freight based on points in the point cloud that are above the identified lower bound and not above the identified upper bound. In one such embodiment, the method further comprises using at least one side-bound line scanner that is oriented to scan in a horizontal plane to identify a side bound of the loaded freight, and dimensioning the loaded freight based on points in the point cloud that are above the identified lower bound comprises dimensioning the loaded freight based on points in the point cloud that are above the identified lower bound and inside the identified side bound.

In at least one embodiment, using the at least one line scanner to identify the lower bound of the loaded freight comprises operating the at least one line scanner between an upper scan limit and a lower scan limit. In one such embodiment, at least one of the upper scan limit and the lower scan limit is configurable; in another such embodiment, the method further comprises setting the upper scan limit based on a maximum height of the 3D point cloud; in another such embodiment, the method further comprises setting the lower scan limit based on a minimum height of the 3D point cloud.

In at least one embodiment, using the at least one line scanner to identify the lower bound of the loaded freight comprises operating the at least one line scanner below an upper scan limit.

In at least one embodiment, the method comprises: receiving a 3D point cloud that is representative of an object; using one or more line scanners to identify one or more respective outer bounds of the object; and dimensioning the object based on points in the point cloud, wherein each of the points in the point cloud that are used for dimensioning the object is at or inside every identified outer bound.

Moreover, any of the variations and permutations described herein can be implemented with respect to any embodiments, including with respect to any method embodiments and with respect to any system embodiments. Furthermore, this flexibility and cross-applicability of embodiments is present in spite of the use of slightly different language (e.g., process, method, steps, functions, set of functions, and the like) to describe and or characterize such embodiments.

Before proceeding with this detailed description, it is noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as being constructively preceded by a clause such as "In at least one embodiment . . . ." And it is for reasons akin to brevity and clarity of presentation that this implied leading clause is not repeated ad nauseum in this detailed description.

Figure 1:
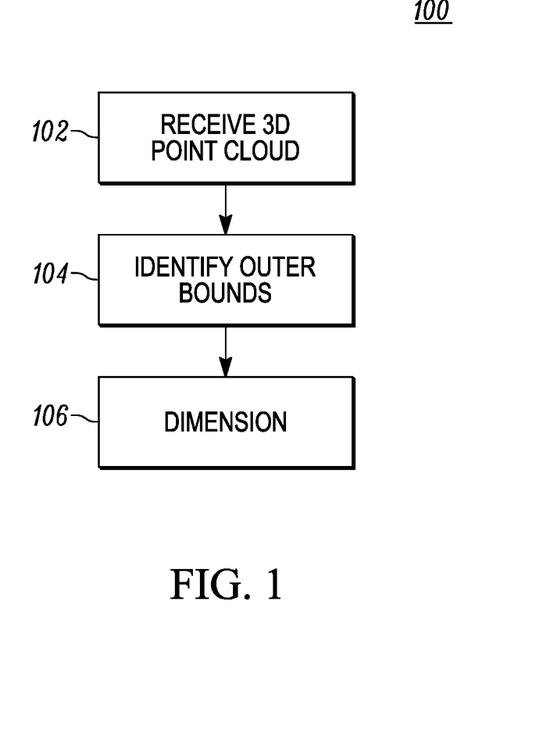
FIG. 1 depicts a first example method, in accordance with some embodiments.

FIG. 1 depicts a first example method, in accordance with some embodiments. In particular, FIG. 1 depicts the method 100. The method 100 includes receiving a 3D point cloud at step 102, identifying outer bounds at step 104, and dimensioning at step 106.

At step 102, the received 3D point cloud is representative of an object. The 3D point cloud may be generated from a depth sensor, or an array of depth sensors.

At step 104, one or more line scanners are used to identify one or more respective outer bounds of the object. The line scanners may be LIDAR (Light Detection and Ranging) line scanners and be capable of scanning a plane to determine an outer bound of an object. Example outer bounds may be any one of a lower bound, an upper bound, side bounds, front bounds, or rear bounds.

At step 106, the object is dimensioned based on points in the point cloud, wherein each of the points in the point cloud that is used for dimensioning the object is at or inside every identified outer bound. The dimensioning may occur by filtering out points in the point cloud that are outside of the identified outer bounds, resetting the point cloud values to the identified outer bounds, deleting points in the point cloud that are outside of the identified outer bounds, and the like.

Figure 2:
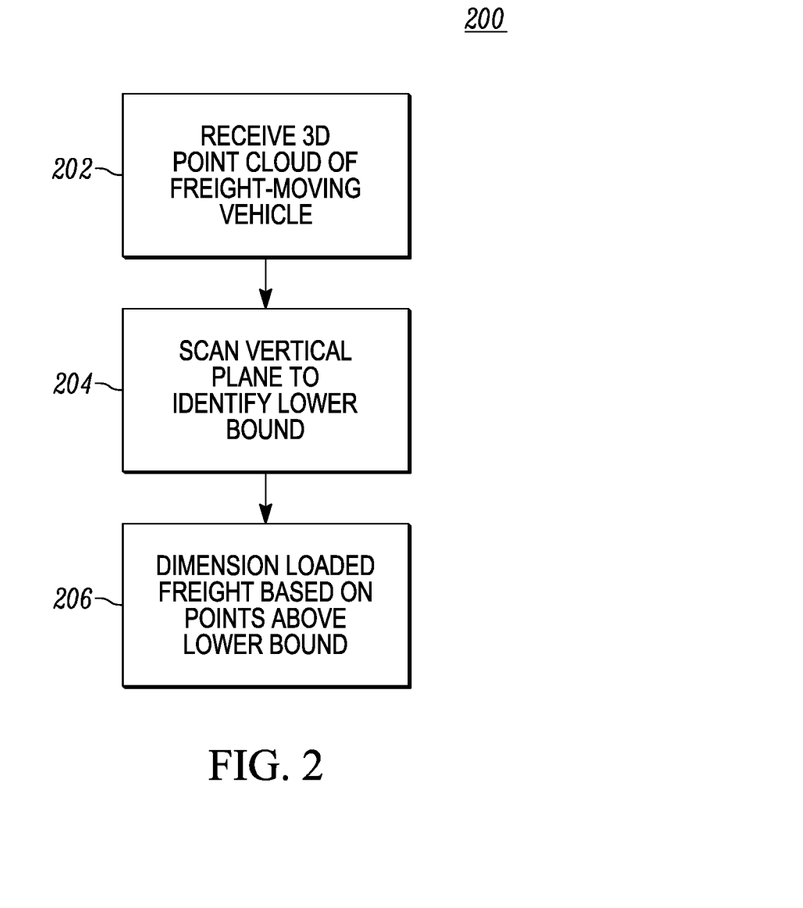
FIG. 2 depicts a second example method, in accordance with some embodiments.

FIG. 2 depicts a second example method, in accordance with some embodiments. In particular, FIG. 2 depicts the method 200. The method 200 includes receiving a 3D point cloud at step 202, identifying a lower bound at step 204, and dimensioning at step 206.

At step 202, the received 3D point cloud is representative of a freight-moving vehicle. The 3D point cloud may be generated from a depth sensor, or an array of depth sensors. The depth sensor may be installed over the freight-moving vehicle and be configured to generate the point cloud as the freight-moving vehicle drives past, or under, the depth sensor.

At step 204, a line scanner, oriented to scan in a vertical plan and positioned to capture the bottom portion of the freight, identifies a lower bound of the loaded freight. The line scanners may be LIDAR line scanners and be capable of scanning the vertical plane to determine the lower bound of the freight. To determine the lower bound, the LIDAR line scanner scans the vertical plane and returns depth values. Based on a known location of the LIDAR line scanner and a known position of the freight-moving vehicle, a lower bound of the freight can be identified.

One method to determine the lower bound is to identify a step-change in returned depth values, and identifying the lower bound as the point where the depth readings from the LIDAR line scanner step from being close to far.

At step 206, the loaded freight is dimensioned based on points in the point cloud, wherein each of the points in the point cloud that is used for dimensioning the object is at or above the identified lower bound. Similar to step 106 of method 100, the dimensioning may occur by filtering out points in the point cloud that are below the identified lower bound, resetting the point cloud values of points below the identified lower bound to the identified lower bound, deleting points in the point cloud that are below the identified lower bound, and the like.

In at least one embodiment, dimensioning the loaded freight based on points in the point cloud includes generating a reduced point cloud at least in part by removing from the received point cloud all points lower than the identified lower bound and dimensioning the loaded freight using the reduced point cloud.

The dimension of freight can be output to another server for use in tracking of the freight. Example methods of tracking include calculating a volume of the freight, a density of the freight, and the like.

Figure 3:
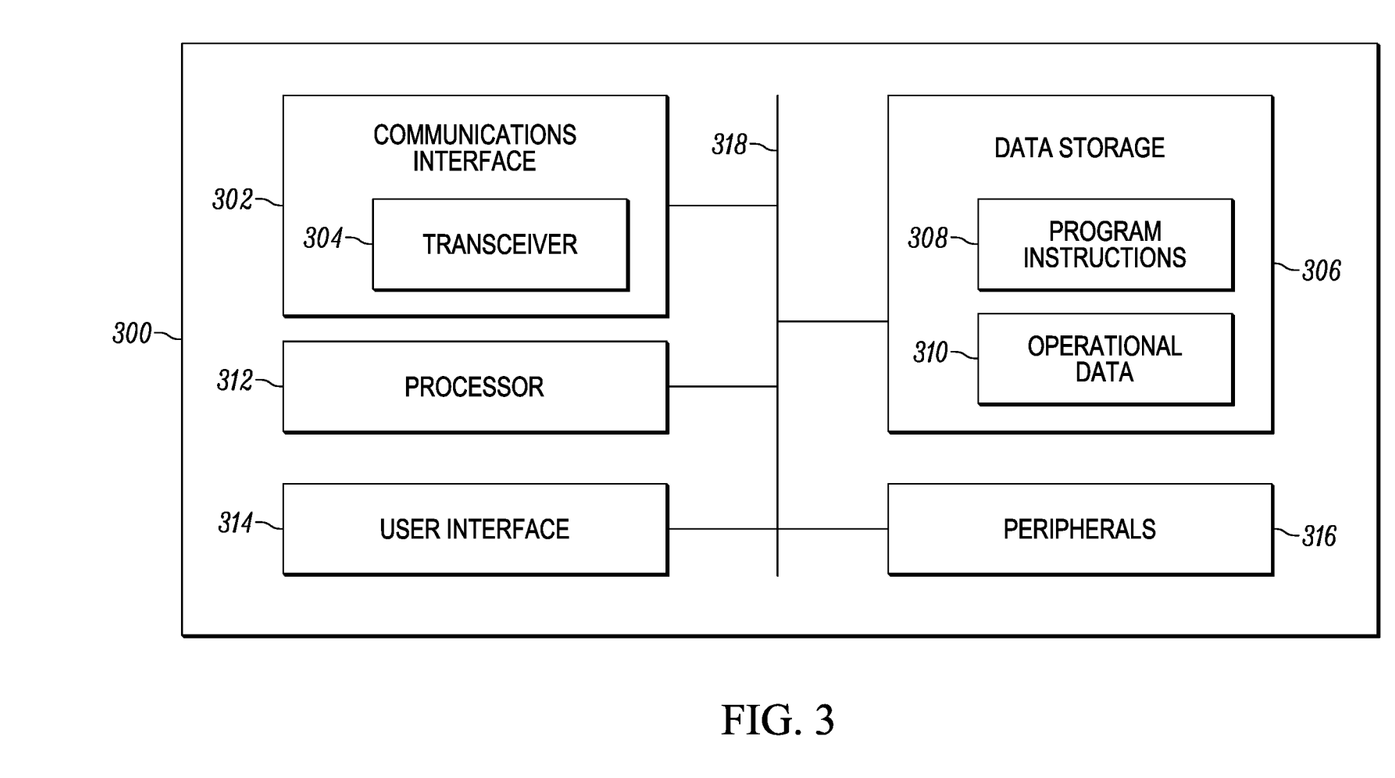
FIG. 3 depicts a block diagram of an example computer processing system, in accordance with some embodiments.

FIG. 3 depicts a block diagram of an example computer processing system, in accordance with some embodiments. In particular, FIG. 3 depicts the computer processing system 300. The computer processing system 300 includes a communications interface 302 (that includes a transceiver 304), data storage 306 (that contains program instructions 308 and operational data 310), a processor 312, a user interface 314, peripherals 316, and a communication bus 318. This arrangement is presented by way of example and not limitation, as other example arrangements could be described here.

The computer processing system 300 may be found in portions of the disclosed invention, to include the depth sensor, the line scanner, the freight-dimensioning module, or the like. Not all elements depicted as part of the computer processing system 300 are required in all elements. As just one example, the computer processing system in one of the LIDAR line scanners may be equipped with a transceiver 304 if it connects wirelessly to a freight-dimensioning module, however in some embodiments, the LIDAR line scanner may be wired to the freight dimensioning module and the transceiver 304 is not required.

As stated above, the communication interface 302 includes the transceiver 304. The transceiver 304 may be configured (e.g., tuned) to receive and transmit on one of a set of channels. The transceiver 304 may be a single component, or realized as a separate transmitter and receiver, as known by those with skill in the art. The communication interface 302 may be configured to be operable for communication according to one or more wireless-communication protocols, some examples of which include LMR, LTE, APCO P25, ETSI DMR, TETRA, Wi-Fi, Bluetooth, and the like. The communication interface 302 may also include one or more wired-communication interfaces (for communication according to, e.g., Ethernet, USB, and/or one or more other protocols.) The communication interface 302 may include any necessary hardware (e.g., chipsets, antennas, Ethernet interfaces, etc.), any necessary firmware, and any necessary software for conducting one or more forms of communication with one or more other entities as described herein.

The data storage 306 may take the form of any non-transitory computer-readable medium or combination of such media, some examples including flash memory, read-only memory (ROM), and random-access memory (RAM) to name but a few, as any one or more types of non-transitory data-storage technology deemed suitable by those of skill in the relevant art could be used. As depicted in FIG. 3, the data storage 306 contains program instructions 308 executable by the processor 312 for carrying out various functions described herein, and further is depicted as containing and operational data 310, which may include any one or more data values stored by and/or accessed by the computing device in carrying out one or more of the functions described herein.

The processor 312 may include one or more processors of any type deemed suitable by those of skill in the relevant art, some examples including a general-purpose microprocessor and a dedicated digital signal processor (DSP).

The user interface 314 may include one or more input devices (a.k.a. components and the like) and/or one or more output devices (a.k.a. components and the like.) With respect to input devices, the user interface 314 may include one or more touchscreens, buttons, switches, microphones, and the like. With respect to output devices, the user interface 314 may include one or more displays, speakers, light emitting diodes (LEDs), and the like. Moreover, one or more components (e.g., an interactive touchscreen and display) of the user interface 314 could provide both user-input and user-output functionality. Other user interface components could also be present, as known to those of skill in the art.

The peripherals 316 may include any computing device accessory, component, or the like, that is accessible to and useable by the computing device during operation. Example peripherals 316 include a GPS receiver, an altimeter, an RSSI sensor, a motion sensor and the like.

In an embodiment, the various components of the computer processing system 300 are all communicatively coupled with one another via a communication bus 318 (or other suitable communication network, or the like.)

Figure 4:
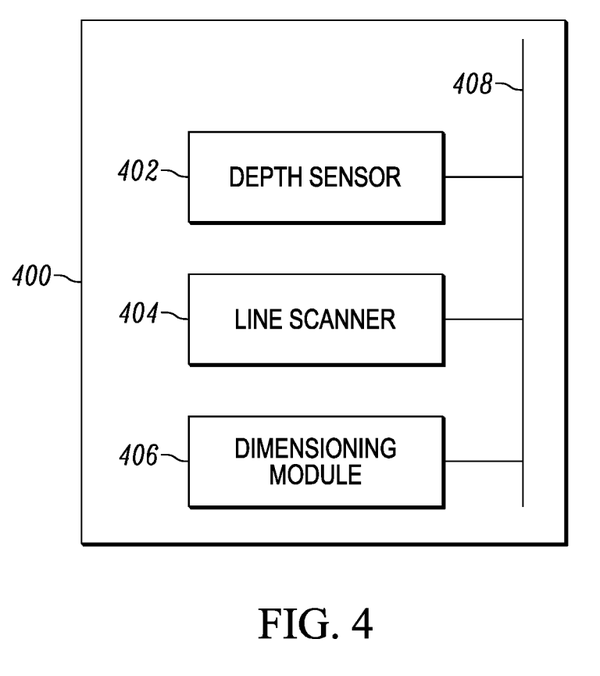
FIG. 4 depicts a block diagram of an example system, in accordance with some embodiments.

FIG. 4 depicts a block diagram of an example system, in accordance with some embodiments. In particular, FIG. 4 depicts the system 400. The system 400 includes a depth sensor 402, a line scanner 404, a dimensioning module 406, and a communications bus 408.

The system 400 may be configured to perform the method 100 or 200. For example, the depth sensor 402 may perform either the step 102 or step 202 to receive a 3D point cloud of the object or freight-loaded vehicle, respectively. The line scanner 404 may perform either step 104 or 204 to identify an outer bound or lower bound, respectively. The dimensioning module 406 may perform either step 106 or 206 to dimension the object or the loaded freight, respectively. The above components are connected via the system bus 408.

The line scanner 404 may be at least one line scanner configured to identify a bound, such as an outer bound or a lower bound.

Figure 5A:
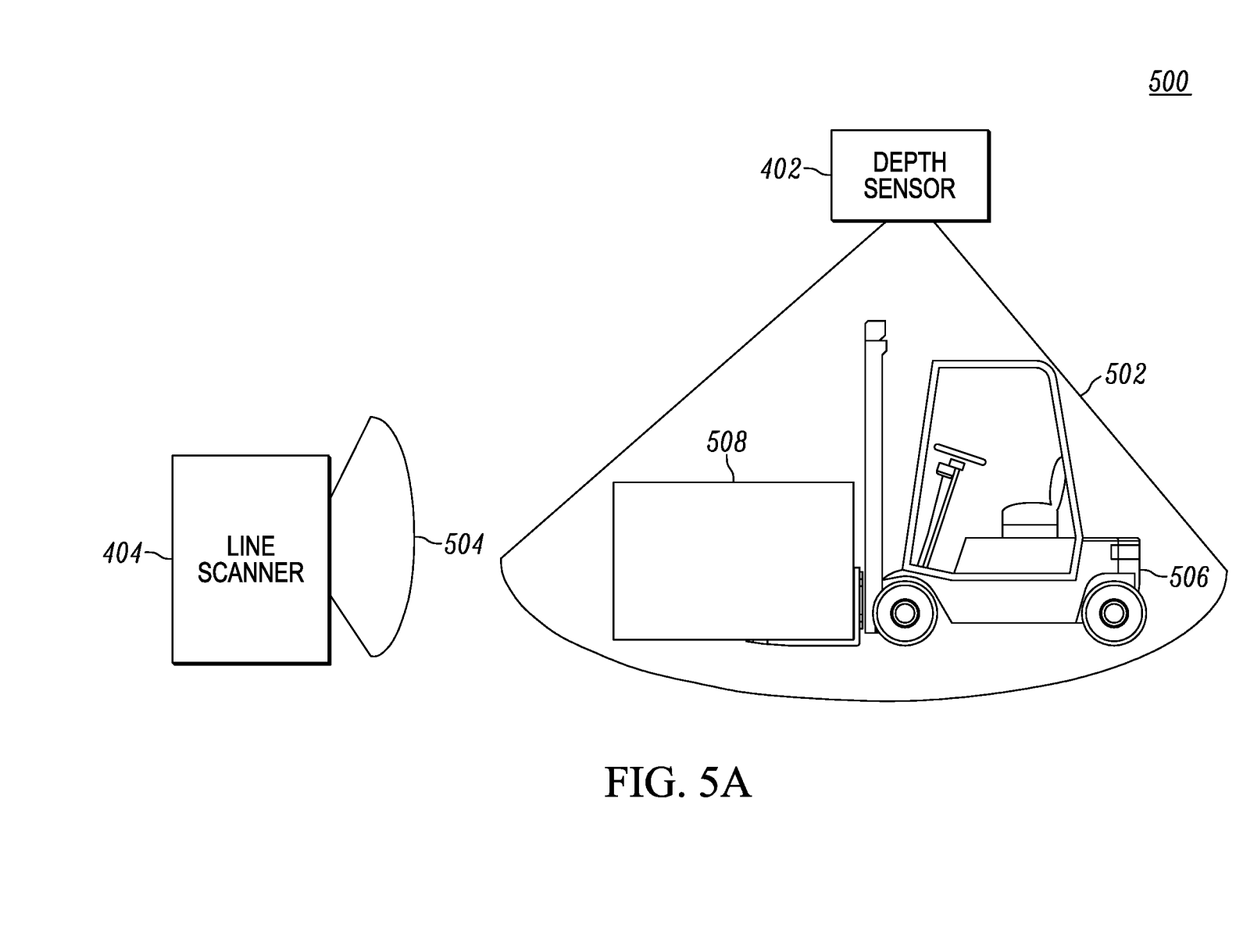
FIG. 5A depicts an overview of a first example scenario, in accordance with some embodiments.

FIG. 5A depicts an overview of a first example scenario, in accordance with some embodiments. In particular, FIG. 5A depicts a scenario 500. The scenario 500 includes the depth sensor 402, the line scanner 404, a 3D point cloud field of view 502, a vertical plan 504, a freight-moving vehicle 506, and freight 508. The scenario 500 depicts a side view of components of the system 400.

The depth sensor 402 is configured to generate a 3D point cloud of objects in the 3D point cloud field of view 502. While the depth sensor 402 is depicted as a single depth sensor, it may also be an array of depth sensors in different positions. Data from the array of depth sensors may be fused together into a single 3D point cloud representative of the objects in the field of view.

The line scanner 404 is configured to scan in the vertical plane 504. The freight-moving vehicle 506 carrying the freight 508 drives through the vertical plane 504. The line scanner 404 scans in the vertical plane 504 as the freight 508 passes through the vertical plane 504 to identify the lower bound of the freight.

In some embodiments, the line scanner 404 comprises at least one LIDAR line scanner. In another embodiment, the line scanner 404 is affixed to a structure, such a wall, a door frame, or a bump post. In yet another embodiment, the line scanner 404 is one line scanner.

In some embodiments, the lower bound is a lower point. The lower point may be set by the lowest detected point of the freight, the closest point to the floor, an average of the data points of several line scanner readings as the freight passes the line scanner, or other similar manner. When dimensioning the loaded freight based on points in the point cloud, each of the points in the point cloud that are used for dimensioning the loaded freight is at or above the identified lower point.

In some embodiments, the lower bound is a lower contour, and identifying the lower bound of the loaded freight is further based on positioning information regarding one or both of the freight-moving vehicle and the loaded freight. In such an embodiment, positioning information of either the freight-moving vehicle or the loaded freight is used to identify the lower contour. As the freight-moving vehicle passes through the vertical plane in front of the line scanner, the line scanner performs scans of the vertical plane to identify a lower bound. The lower contour may be a line between a first identified lower bound at the front of the freight and a second identified lower bound at the back of the freight. The lower contour may also be non-linear and based on several different readings from the line scanner as the freight moves past the line scanner.

In one embodiment, using the at least one line scanner to identify the lower bound of the loaded freight is carried out response to detecting a triggering event. Example triggering events include receiving an indication from a motion sensor, detecting the identity of a freight-moving vehicle from an optical or RFID (Radio Frequency Identification) scanner, or a location-based trigger based on the known location of the freight-moving vehicle.

Figure 5B:
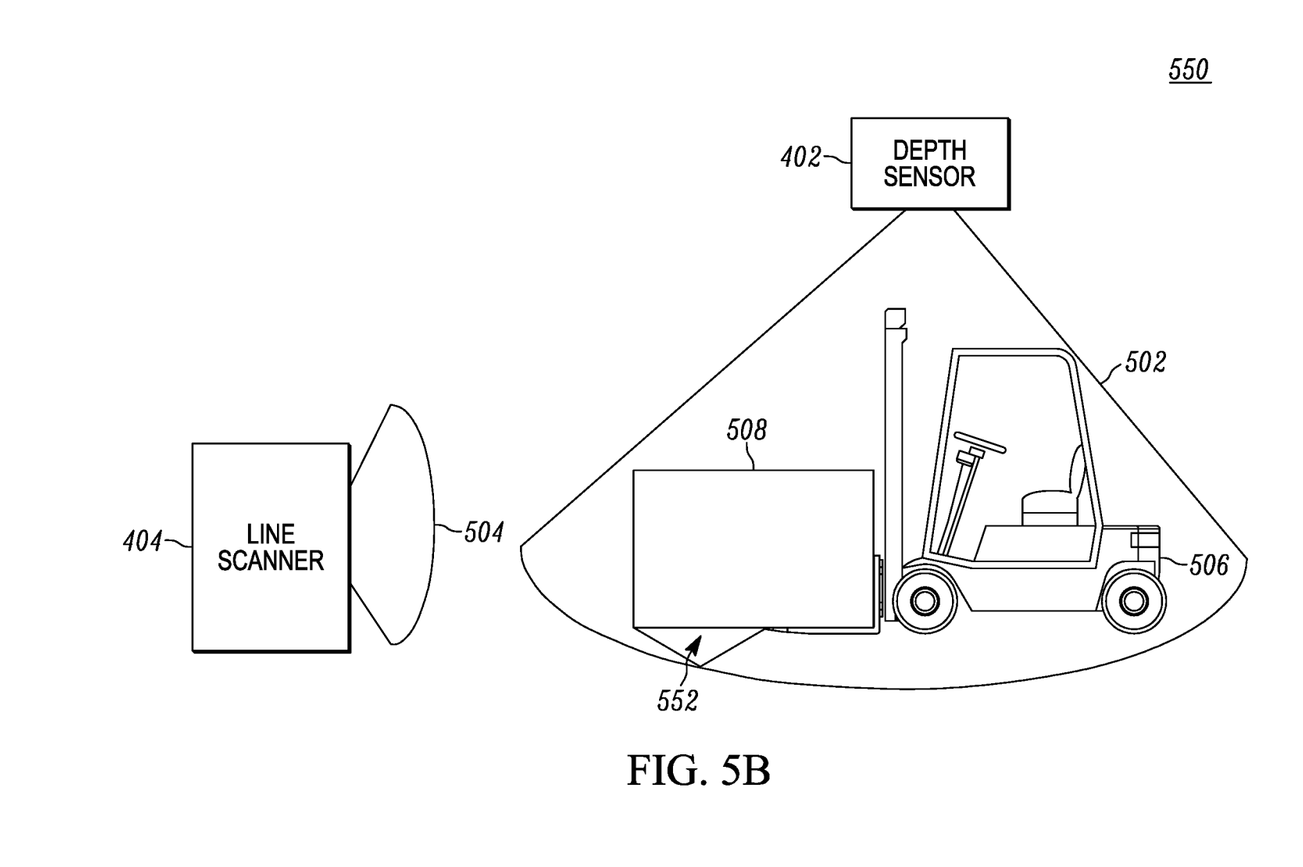
FIG. 5B depicts an overview of a second example scenario, in accordance with some embodiments.

FIG. 5B depicts an overview of a second example scenario, in accordance with some embodiments. In particular, FIG. 5B depicts a scenario 550. The scenario 550 includes all of the same elements of the scenario 500 of FIG. 5A: the depth sensor 402, the line scanner 404, a 3D point cloud field of view 502, a vertical plan 504, a freight-moving vehicle 506, and freight 508. The scenario 500 also includes a lower protrusion 552 that extends from the freight 508.

The lower protrusion 552 can be from irregularly shaped freight, portions of freight that protrude down when lifted, portions of damaged freight, and the like. As the freight 508, with the lower protrusion 552, and the freight-moving vehicle 506 drive past the line scanner 404 and the vertical plane 504, a lower bound of the freight 508 is identified. In an embodiment where the lower bound is a lower contour, the shape of the lower contour is based on the line scanner's detection of the lower protrusion 552.

Figure 6:
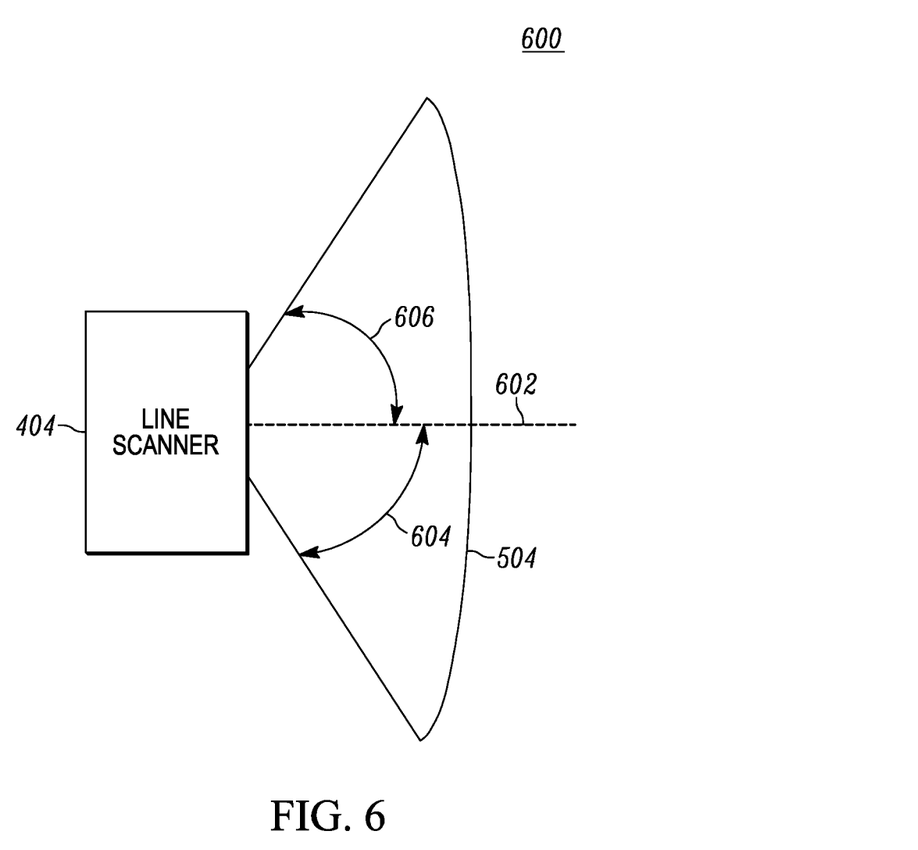
FIG. 6 depicts a view of an example line scanner, in accordance with some embodiments.

FIG. 6 depicts a view of an example line scanner, in accordance with some embodiments. In particular, FIG. 6 depicts the view 600. The view 600 includes the line scanner 404, the vertical plane 504, a horizontal plane 602, a first angle 604, and a second angle 606.

In one embodiment, the line scanner 404 is oriented to scan the vertical plane 504 between the first angle 604 below the horizontal plane 602 and the second angle 606 above the horizontal plane 602. Either one or both of the upper and lower scan limits may be configurable. For example, the upper scan limit may be based on a maximum height of the 3D point cloud and the lower scan limit may be based on a minimum height of the 3D point cloud.

In another embodiment, using the at least one line scanner to identify the lower bound of the loaded freight includes operating the at least one line scanner below an upper scan limit.

In one embodiment, using the at least one line scanner to identify the lower bound of the loaded freight includes operating the at least one line scanner between an upper scan limit and a lower scan limit. For example, the lower scan limit may be set by limiting the first angle 604 to a set value and the upper scan limit may be set by limiting the second angle 606.

Figure 7:
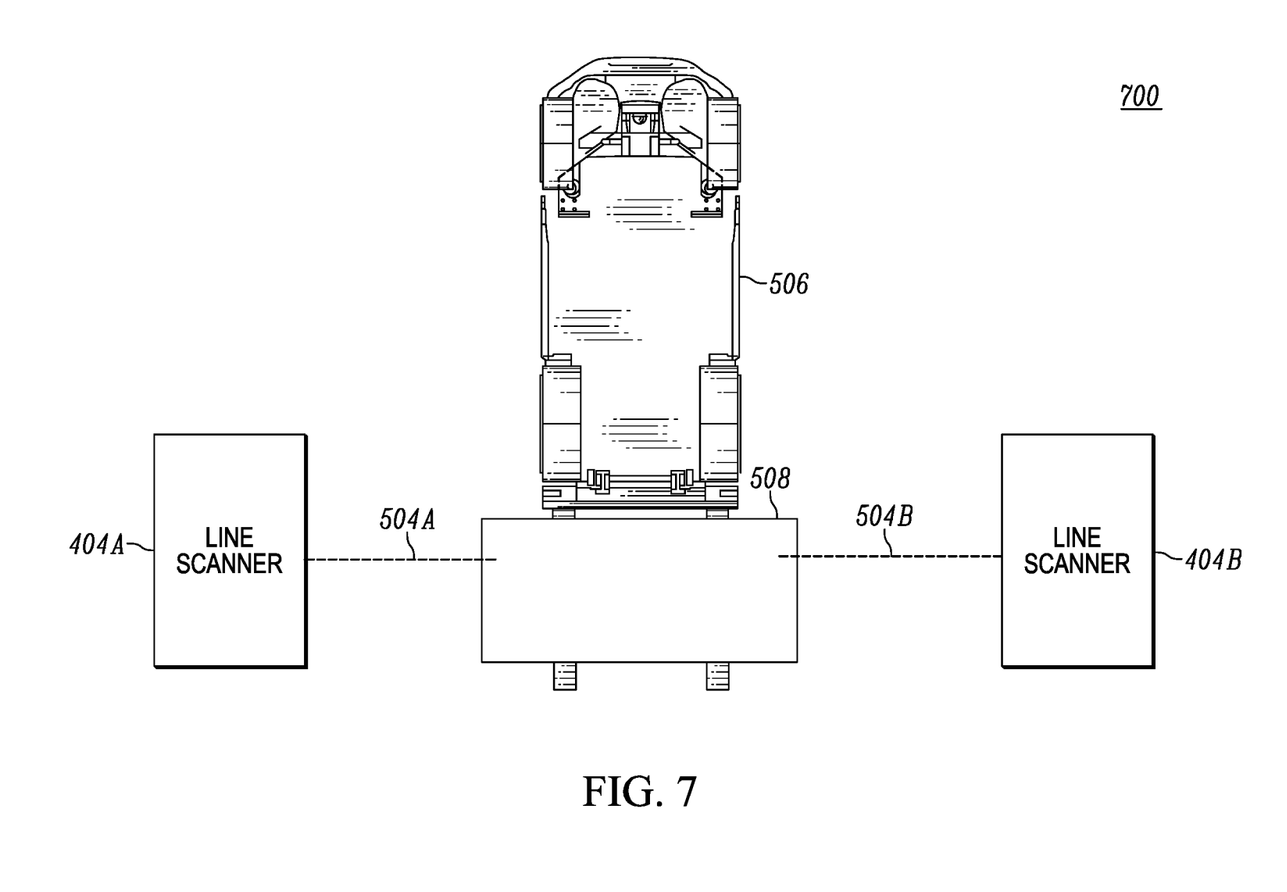
FIG. 7 depicts a first example configuration of multiple line scanners, in accordance with some embodiments.

FIG. 7 depicts a first example configuration of multiple line scanners, in accordance with some embodiments. In particular, FIG. 7 depicts the configuration 700. The configuration 700 is a top-view of the configuration and includes the line scanners 404A and 404B, vertical planes 504A and 504B, associated with line scanners 404A and 404B, respectively, the freight-moving vehicle 506, and freight 508.

The line scanners 404A and 404B are similar to the line scanner 404 depicted in FIGS. 4-6 and are positioned on substantially opposite sides of the freight 508.

Figure 8:
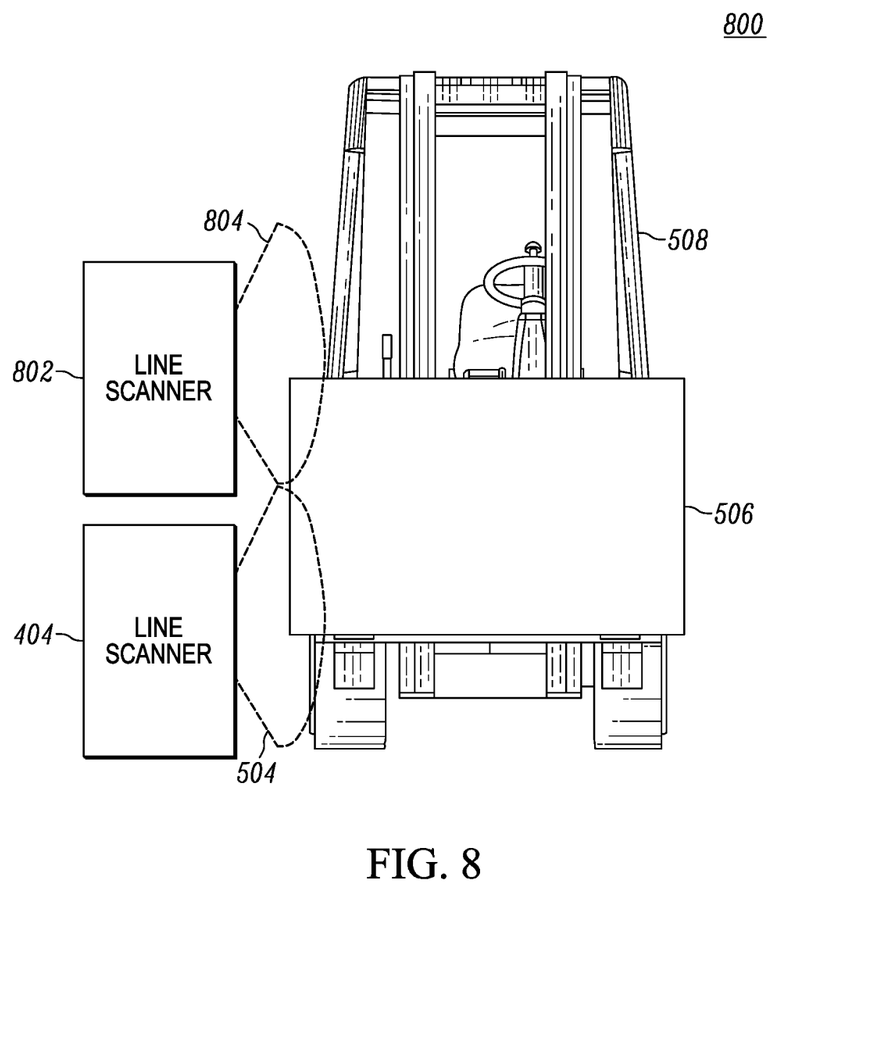
FIG. 8 depicts a second example configuration of multiple line scanners, in accordance with some embodiments.

FIG. 8 depicts a second example configuration of multiple line scanners, in accordance with some embodiments. In particular, FIG. 8 depicts the configuration 800. The configuration 800 includes the line scanner 404, the vertical plane 504, freight 506, the freight-moving vehicle 508, a line scanner 802, and a vertical plane 804.

In one embodiment, the method further includes using at least one upper-bound line scanner that is oriented to scan in a vertical plane to identify an upper bound of the loaded freight, and dimensioning the loaded freight based on points in the point cloud includes dimensioning the loaded freight based on points in the point cloud that are above the identified lower bound and not above the identified upper bound.

Similar to the configuration 500 depicted in FIG. 5A, the line scanner 404 scans vertical plane 504 to identify a lower bound of the freight 506. Additionally, the line scanner 802 is an upper bound line scanner configured to scan the vertical plane 804 to identify the upper bound of the freight 506. Dimensioning the freight 506 is based on points in the 3D point cloud that are above the lower bound identified by the line scanner 404 and not above the upper bound identified by the line scanner 802.

In one embodiment, dimensioning the freight may further comprise using at least one side-bound line scanner that is oriented to scan in a horizontal plane to identify a side bound of the loaded freight. In such an embodiment, dimensioning the loaded freight based on points in the point cloud that are above the identified lower bound comprises dimensioning the loaded freight based on points in the point cloud that are above the identified lower bound and inside the identified side bound.

In one embodiment, dimensioning the loaded freight includes rotating the 3D point cloud. Rotation of the 3D point cloud may be advantageous if the freight-moving vehicle is not carrying the freight on level. For example, the freight may be tilted backwards towards the forklift. In such an embodiment, rotation of the 3D point cloud may be based on the identified lower bound. In one rotation example, the identified lower bound is a lower contour in the shape of a line that is on a 5-degree incline, meaning the freight is inclined 5 degrees off a horizontal floor. The 3D point cloud may be rotated by 5 degrees to counter the incline imposed on the freight by the freight-moving vehicle, thus leveling the 3D point cloud. In another rotation example, the 3D point cloud may be rotated by identifying a minimum (i.e., lowest) point of the lower contour and rotating the 3D point cloud such that all points of the lower contour are at the height of the identified minimum point.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
    receiving a 3D point cloud that is representative of a freight-moving vehicle having loaded freight;
    using at least one line scanner that is oriented to scan in a vertical plane and positioned to identify a lower bound of the loaded freight; and
    dimensioning the loaded freight based on points in the point cloud, wherein each of the points in the point cloud that are used for dimensioning the loaded freight is at or above the identified lower bound.

2. The method of claim 1, wherein the at least one line scanner comprises at least one LIDAR (Light Detection and Ranging) line scanner.

3. The method of claim 1, wherein the line scanner is affixed to a fixed structure.

4. The method of claim 1, wherein the at least one line scanner is oriented to scan in the vertical plane between a first angle below horizontal and a second angle above horizontal.

5. The method of claim 1, wherein the at least one line scanner is one line scanner.

6. The method of claim 1, wherein the at least one line scanner includes two line scanners that are positioned on substantially opposite sides of the loaded freight.

7. The method of claim 1, wherein the lower bound is a lower point.

8. The method of claim 1, wherein the lower bound is a lower contour, wherein identifying the lower bound of the loaded freight is further based on positioning information regarding one or both of the freight-moving vehicle and the loaded freight.

9. The method of claim 1, wherein using the at least one line scanner to identify the lower bound of the loaded freight is carried out responsive to detecting a triggering event.

10. The method of claim 9, wherein the triggering event comprises receiving an indication from a motion sensor.

11. The method of claim 1, wherein dimensioning the loaded freight based on points in the point cloud comprises:
    generating a reduced point cloud at least in part by removing from the received point cloud all points lower than the identified lower bound; and
    dimensioning the loaded freight using the reduced point cloud.

12. The method of claim 1, further comprising using at least one upper-bound line scanner that is oriented to scan in a vertical plane to identify an upper bound of the loaded freight, wherein dimensioning the loaded freight based on points in the point cloud comprises dimensioning the loaded freight based on points in the point cloud that are above the identified lower bound and not above the identified upper bound.

13. The method of claim 1, further comprising using at least one side-bound line scanner that is oriented to scan in a horizontal plane to identify a side bound of the loaded freight, wherein dimensioning the loaded freight based on points in the point cloud that are above the identified lower bound comprises dimensioning the loaded freight based on points in the point cloud that are above the identified lower bound and inside the identified side bound.

14. The method of claim 1, wherein using the at least one line scanner to identify the lower bound of the loaded freight comprises operating the at least one line scanner between an upper scan limit and a lower scan limit.

15. The method of claim 14, wherein at least one of the upper scan limit and the lower scan limit is configurable.

16. The method of claim 14, further comprising setting the upper scan limit based on a maximum height of the 3D point cloud.

17. The method of claim 14, further comprising setting the lower scan limit based on a minimum height of the 3D point cloud.

18. The method of claim 1, wherein using the at least one line scanner to identify the lower bound of the loaded freight comprises operating the at least one line scanner below an upper scan limit.

19. A system comprising:
at least one depth sensor configured to obtain a 3D point cloud that is representative of a freight-moving vehicle having loaded freight;
at least one line scanner oriented to scan in a vertical plane and positioned to identify a lower bound of the loaded freight; and
a freight-dimensioning module configured to dimension the loaded freight based on points in the point cloud, wherein each of the points in the point cloud that are used for dimensioning the loaded freight is at or above the identified lower bound.

20. A method comprising:
receiving a 3D point cloud that is representative of an object;
using one or more line scanners positioned to identify one or more respective outer bounds of the object, including a lower bound of the object; and
dimensioning the object based on points in the point cloud, wherein each of the points in the point cloud that are used for dimensioning the object is at or inside every identified outer bound.

\* \* \* \* \*